United States Patent [19]

Kavage et al.

[11] 4,408,295

[45] Oct. 4, 1983

[54] OPTICAL INSPECTOR FOR SLAT-TYPE CONTAINER FILLING MACHINE

[75] Inventors: William T. Kavage; Marvin E. Monroe, both of Sunbury, Ohio

[73] Assignee: Optek, Inc., Galena, Ohio

[21] Appl. No.: 211,211

[22] Filed: Nov. 28, 1980

[51] Int. Cl.³ .................... G06F 15/20; B65B 57/10; B65B 57/18

[52] U.S. Cl. .................................... 364/552; 53/494; 250/208; 250/563; 364/478

[58] Field of Search ............... 364/552, 555, 478, 479; 53/53, 54, 55, 57, 58, 493, 494; 221/81, 82, 233; 250/200, 202, 561, 562, 563, 565, 208, 223 R

[56] References Cited

U.S. PATENT DOCUMENTS 4,075,462 2/1978 Rowe ...................... 250/222 PC X 4,094,129 6/1978 List .................................. 53/493 X 4,139,766 2/1979 Conway ...................... 235/92 V X 4,241,293 12/1980 Bross ......................... 250/223 R X

*Primary Examiner*—Felix D. Gruber

*Attorney, Agent, or Firm*—Frank H. Foster

[57] ABSTRACT

An optical inspecting apparatus for detecting the absence of an object from a cavity of a slat filling machine. The inspector detects the empty cavity, determines the container which will be short filled and tracks the container and causes the ejection of the container from the production line. Discrete photodiodes lined along the cavity path are actuated in sequence and phototransistors detect whether light passes through the slat. The control computer using data in its memory analyzes the result of scanning through the diodes to determine the short filled bottle and causes its ejection as it passes an ejection station.

19 Claims, 12 Drawing Figures

FIG. 1
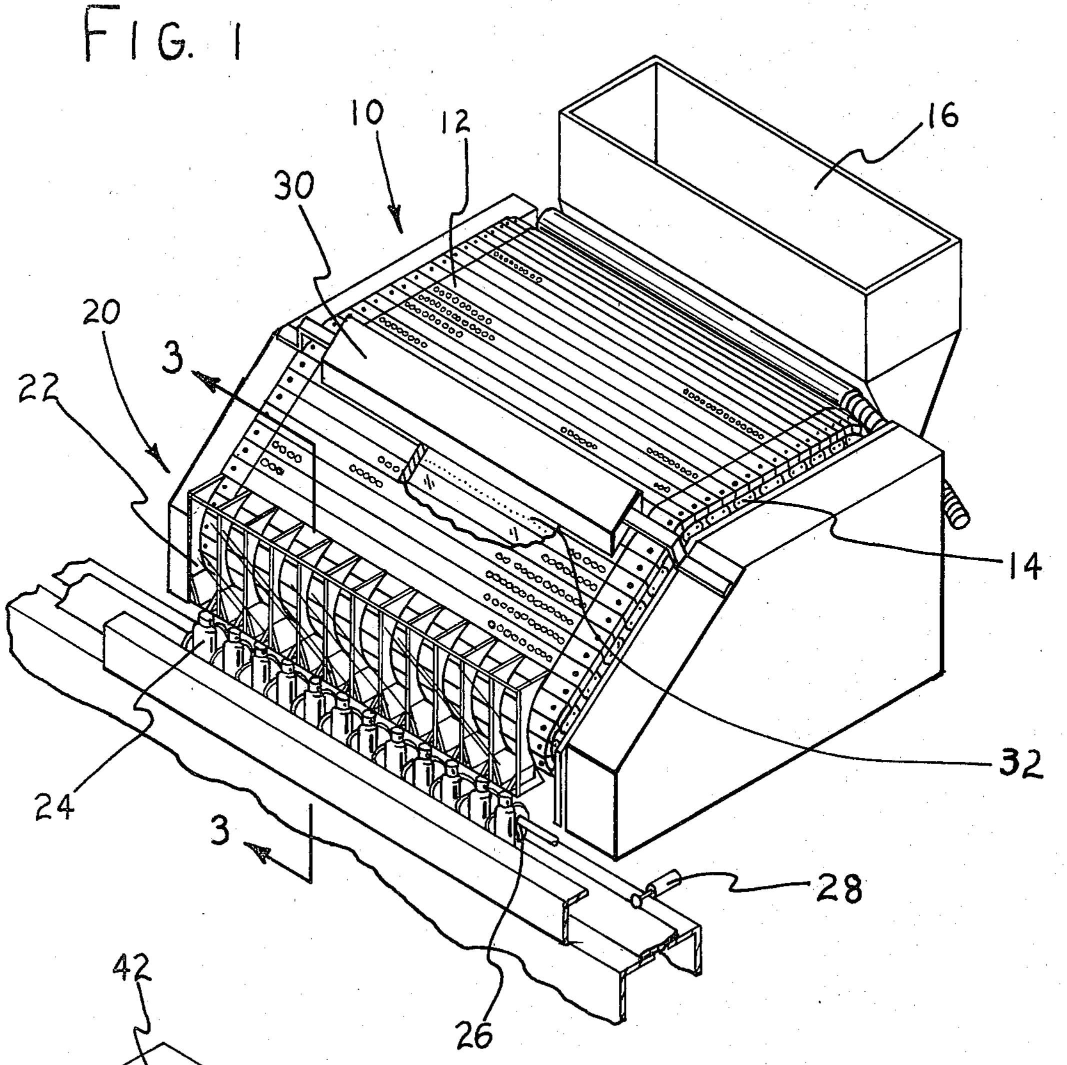
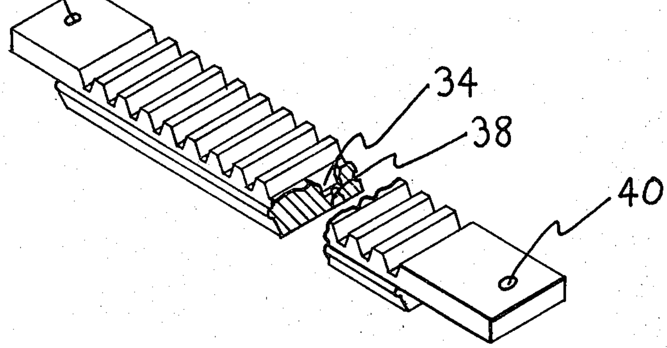
FIG. 2

FIG 5
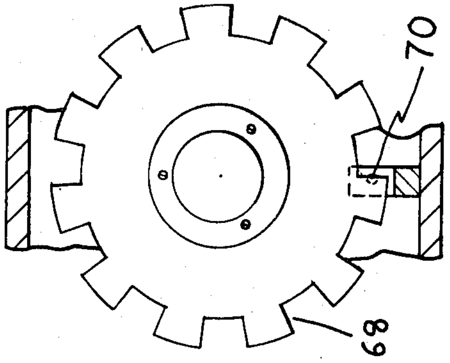
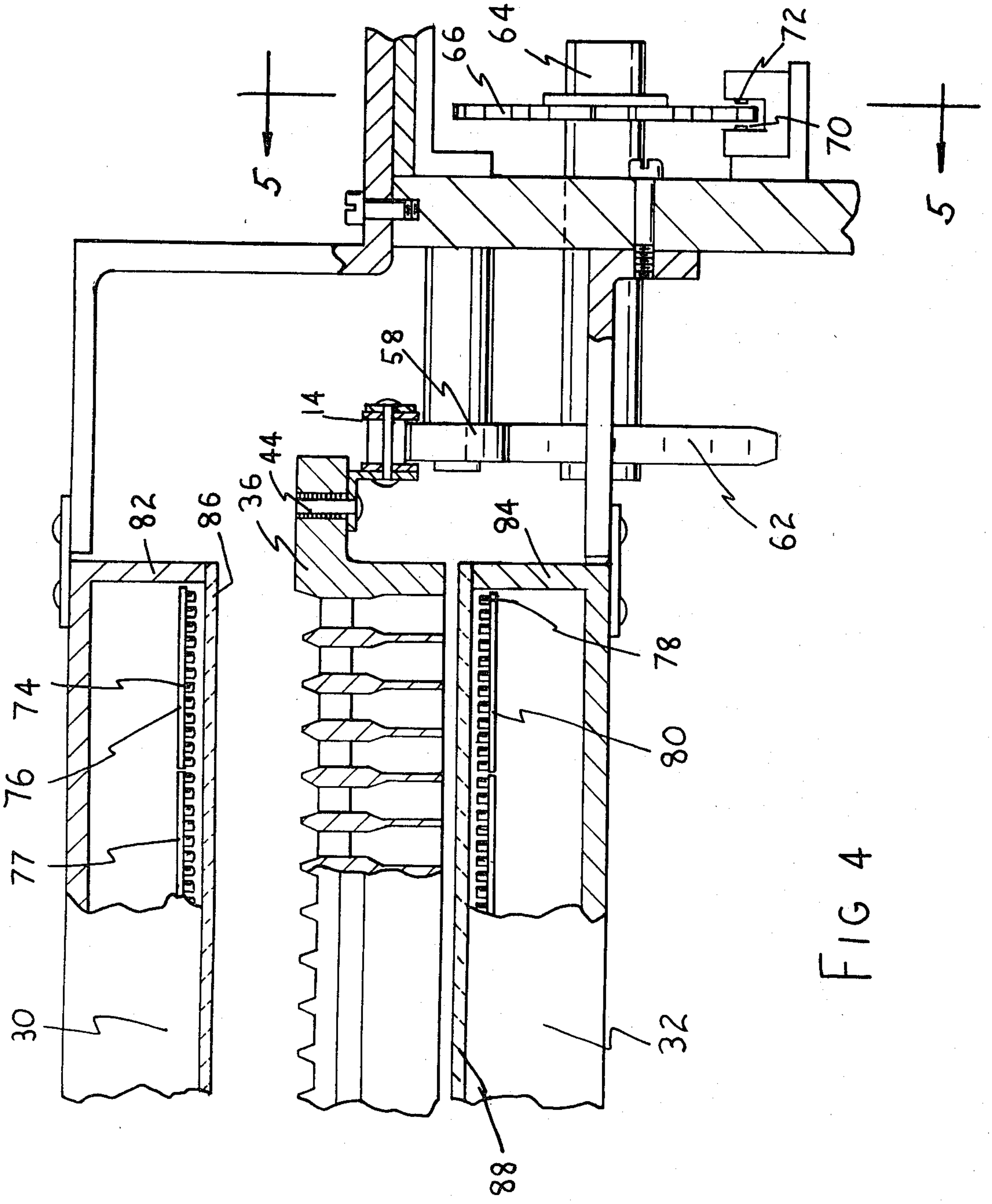
FIG 4

| OUTPUTS | | | | | | | | INPUTS | | | | |
|---|---|---|---|---|---|---|---|---|---|---|---|---|
| Illegal State Test Point | Even Enable | Odd Enable | | | | Increment Even | VIS | Diosel Ø | VIS/IR | ALSO +1 | CARD SEL. | CARRY IN |
| B7 | B6 | B5 | B4 | B3 | B2 | B1 | B0 | A4 | A3 | A2 | A1 | A0 |
| 0 | 1 | 1 | 0 | 0 | 0 | 0 | 1 | 0 | 0 | 0 | 0 | 0 |
| 1 | 0 | 0 | 0 | 0 | 0 | 0 | 1 | 0 | 0 | 0 | 0 | 1 |
| 0 | 1 | 1 | 0 | 0 | 0 | 0 | 1 | 0 | 0 | 0 | 1 | 0 |
| 1 | 1 | 1 | 0 | 0 | 0 | 0 | 1 | 0 | 0 | 0 | 1 | 1 |
| 0 | 1 | 1 | 0 | 0 | 0 | 0 | 1 | 0 | 0 | 1 | 0 | 0 |
| 1 | 0 | 1 | 0 | 0 | 0 | 0 | 1 | 0 | 0 | 1 | 0 | 1 |
| 0 | 1 | 1 | 0 | 0 | 0 | 0 | 1 | 0 | 0 | 1 | 1 | 0 |
| 1 | 1 | 1 | 0 | 0 | 0 | 0 | 1 | 0 | 0 | 1 | 1 | 1 |
| 0 | 1 | 1 | 0 | 0 | 0 | 0 | 1 | 0 | 1 | 0 | 0 | 0 |
| 1 | 1 | 1 | 0 | 0 | 0 | 0 | 1 | 0 | 1 | 0 | 0 | 1 |
| 0 | 1 | 1 | 0 | 0 | 0 | 0 | 1 | 0 | 1 | 0 | 1 | 0 |
| 1 | 1 | 1 | 0 | 0 | 0 | 0 | 1 | 0 | 1 | 0 | 1 | 1 |
| 0 | 1 | 1 | 0 | 0 | 0 | 0 | 1 | 0 | 1 | 1 | 0 | 0 |
| 1 | 1 | 1 | 0 | 0 | 0 | 0 | 1 | 0 | 1 | 1 | 0 | 1 |
| 0 | 1 | 1 | 0 | 0 | 0 | 0 | 1 | 0 | 1 | 1 | 1 | 0 |
| 1 | 1 | 1 | 0 | 0 | 0 | 0 | 1 | 0 | 1 | 1 | 1 | 1 |
| 0 | 1 | 0 | 0 | 0 | 0 | 1 | 1 | 1 | 0 | 0 | 0 | 0 |
| 1 | 0 | 0 | 0 | 0 | 0 | 1 | 1 | 1 | 0 | 0 | 0 | 1 |
| 1 | 0 | 1 | 0 | 0 | 0 | 1 | 1 | 1 | 0 | 0 | 1 | 0 |
| 1 | 1 | 1 | 0 | 0 | 0 | 1 | 1 | 1 | 0 | 0 | 1 | 1 |
| 0 | 1 | 1 | 0 | 0 | 0 | 0 | 1 | 1 | 0 | 1 | 0 | 0 |
| 1 | 1 | 0 | 0 | 0 | 0 | 0 | 1 | 1 | 0 | 1 | 0 | 1 |
| 0 | 1 | 1 | 0 | 0 | 0 | 0 | 1 | 1 | 0 | 1 | 1 | 0 |
| 1 | 1 | 1 | 0 | 0 | 0 | 0 | 1 | 1 | 0 | 1 | 1 | 1 |
| 0 | 1 | 1 | 0 | 0 | 0 | 0 | 1 | 1 | 1 | 0 | 0 | 0 |
| 1 | 1 | 1 | 0 | 0 | 0 | 0 | 1 | 1 | 1 | 0 | 0 | 1 |
| 0 | 1 | 1 | 0 | 0 | 0 | 0 | 1 | 1 | 1 | 0 | 1 | 0 |
| 1 | 1 | 1 | 0 | 0 | 0 | 0 | 1 | 1 | 1 | 0 | 1 | 1 |
| 0 | 1 | 1 | 0 | 0 | 0 | 0 | 0 | 1 | 1 | 1 | 0 | 0 |
| 1 | 1 | 1 | 0 | 0 | 0 | 0 | 0 | 1 | 1 | 1 | 0 | 1 |
| 0 | 1 | 1 | 0 | 0 | 0 | 0 | 1 | 1 | 1 | 1 | 1 | 0 |
| 1 | 1 | 1 | 0 | 0 | 0 | 0 | 1 | 1 | 1 | 1 | 1 | 1 |

FIG. 10 82S23

| OUTPUTS | | | | | | | | INPUTS | | | | |
|---|---|---|---|---|---|---|---|---|---|---|---|---|
| CARRY OUT | DS4 ODD | DS4 EVEN | DS4 ODD | DS4 EVEN | DS3 EVEN | DS2 EVEN | DS1 EVEN | DS1 | DS2 | DS3 | DS4 | INCR EVEN |
| B7 | B6 PIN7 | B5 PIN6 | B4 PIN5 | B3 PIN4 | B2 PIN3 | B1 PIN2 | B0 PIN1 | A4 14 | A3 13 | A2 12 | A1 11 | A0 10 |
| 1 | 1 | 1 | 0 | 0 | 0 | 0 | 0 | 0 | 0 | 0 | 0 | 0 |
| 1 | 1 | 1 | 0 | 0 | 0 | 0 | 1 | 0 | 0 | 0 | 0 | 1 |
| 1 | 0 | 0 | 1 | 1 | 0 | 0 | 0 | 0 | 0 | 0 | 1 | 0 |
| 1 | 0 | 0 | 1 | 1 | 0 | 0 | 1 | 0 | 0 | 0 | 1 | 1 |
| 1 | 1 | 1 | 0 | 0 | 1 | 0 | 0 | 0 | 0 | 1 | 0 | 0 |
| 1 | 1 | 1 | 0 | 0 | 1 | 0 | 1 | 0 | 0 | 1 | 0 | 1 |
| 1 | 0 | 0 | 1 | 1 | 1 | 0 | 0 | 0 | 0 | 1 | 1 | 0 |
| 1 | 0 | 0 | 1 | 1 | 1 | 0 | 1 | 0 | 0 | 1 | 1 | 1 |
| 1 | 1 | 1 | 0 | 0 | 0 | 1 | 0 | 0 | 1 | 0 | 0 | 0 |
| 1 | 1 | 1 | 0 | 0 | 0 | 1 | 1 | 0 | 1 | 0 | 0 | 1 |
| 1 | 0 | 0 | 1 | 1 | 0 | 1 | 0 | 0 | 1 | 0 | 1 | 0 |
| 1 | 0 | 0 | 1 | 1 | 0 | 1 | 1 | 0 | 1 | 0 | 1 | 1 |
| 1 | 1 | 1 | 0 | 0 | 1 | 1 | 0 | 0 | 1 | 1 | 0 | 0 |
| 1 | 1 | 1 | 0 | 0 | 1 | 1 | 1 | 0 | 1 | 1 | 0 | 1 |
| 1 | 0 | 0 | 1 | 1 | 1 | 1 | 0 | 0 | 1 | 1 | 1 | 0 |
| 1 | 0 | 0 | 1 | 1 | 1 | 1 | 1 | 0 | 1 | 1 | 1 | 1 |
| 1 | 1 | 1 | 0 | 0 | 0 | 0 | 1 | 1 | 0 | 0 | 0 | 0 |
| 1 | 1 | 1 | 0 | 0 | 0 | 1 | 0 | 1 | 0 | 0 | 0 | 1 |
| 1 | 0 | 0 | 1 | 1 | 0 | 0 | 1 | 1 | 0 | 0 | 1 | 0 |
| 1 | 0 | 0 | 1 | 1 | 0 | 1 | 0 | 1 | 0 | 0 | 1 | 1 |
| 1 | 1 | 1 | 0 | 0 | 1 | 0 | 1 | 1 | 0 | 1 | 0 | 0 |
| 1 | 1 | 1 | 0 | 0 | 1 | 1 | 0 | 1 | 0 | 1 | 0 | 1 |
| 1 | 0 | 0 | 1 | 1 | 1 | 0 | 1 | 1 | 0 | 1 | 1 | 0 |
| 1 | 0 | 0 | 1 | 1 | 1 | 1 | 0 | 1 | 0 | 1 | 1 | 1 |
| 1 | 1 | 1 | 0 | 0 | 0 | 1 | 1 | 1 | 1 | 0 | 0 | 0 |
| 1 | 1 | 1 | 0 | 0 | 1 | 0 | 0 | 1 | 1 | 0 | 0 | 1 |
| 1 | 0 | 0 | 1 | 1 | 0 | 1 | 1 | 1 | 1 | 0 | 1 | 0 |
| 1 | 0 | 0 | 1 | 1 | 1 | 0 | 0 | 1 | 1 | 0 | 1 | 1 |
| 1 | 1 | 1 | 0 | 0 | 1 | 1 | 1 | 1 | 1 | 1 | 0 | 0 |
| 1 | 1 | 0 | 0 | 1 | 0 | 0 | 0 | 1 | 1 | 1 | 0 | 1 |
| 1 | 0 | 0 | 1 | 1 | 1 | 1 | 1 | 1 | 1 | 1 | 1 | 0 |
| 0 | 0 | 1 | 1 | 0 | 0 | 0 | 0 | 1 | 1 | 1 | 1 | 1 |

FIG. 11 82S123

OPTICAL INSPECTOR FOR SLAT-TYPE CONTAINER FILLING MACHINE

TECHNICAL FIELD

This invention is broadly and generally applicable to detecting the presence or absence of discrete objects in an array of predetermined object positions. The invention more particularly relates to an apparatus for the continuous inspection of a machine which automatically fills containers, such as medicament bottles, with a metered number of discrete articles, such as pills. The inspection apparatus detects a condition which will cause a container to be filled with fewer than the intended number of articles and determines the particular container which will be short filled. It then automatically ejects the short filled container from the production lines as the filled containers are conveyed away from the filling machine.

BACKGROUND ART

In manufacturing medicaments for sale, the medicaments are often packaged in containers of convenient quantities. For example, 100 pills may be packaged in a bottle while another bottle may be available containing 250 pills.

One type of prior art dispensing machine for filling these containers is conventionally referred to as a slat filler. In a slat filler the articles such as pills are fed into open cavities formed in an elongated bar, called a slat. The slat is moved along a conveyer to a discharge station where it is tilted for gravity discharge of the articles from the cavities into the containers.

In a slat filler the slats are supported for movement along a continuous, endless closed loop. They move in a direction which is transverse to the elongated slat members. The outer surfaces of the slat members are provided with a plurality of spaced apart cavities which travel along the endless path past filling and then discharging stations. Upon reaching the discharge station, each slat member tilts for simultaneous discharge of all the articles from its cavities.

The containers are automatically positioned by a conveying system below the discharge station along a path below and parallel to the tilting slat members. The falling articles are guided by chutes as they fall out of the cavities of the slats and into the containers. The moving slats are counted or other means is provided for signalling that a selected number of slats have emptied their contents into the containers. After a selected number of slats have dumped their contents into containers an index occurs and the containers are moved from beneath the chutes and are replaced with empty containers to continue the filling process.

Slat filling machines of this general type are manufactured by the Lakso Company and are illustrated in U.S. Pat. Nos. 4,017,003; 3,354,607; and 3,925,960 and in application Ser. No. 46,191 filed June 6, 1979.

One problem which has been experienced with such slat type filling machines is that a cavity may not have an article in it as it approaches the discharge station. Without an inspection apparatus, the absence of an article will result in some particular container having one article fewer than the quantity which is labelled on the container and for which the customer will pay. Therefore, one purpose of the present invention is to continuously inspect these cavities to detect the absence of an article from a cavity and to automatically eject a container which is short filled as a result of this absence.

We have previously constructed an inspection system in which light energy, ordinarily in the infrared portion of the electromagnetic spectrum, is radiated from a series of photoradiators at each cavity. The radiation source consisted of a series of photodiodes, one positioned in alignment with each cavity. A corresponding series of cooperating photodetectors was positioned on the opposite side of each slat having one detector aligned with each cavity to receive any light which passes through the cavity. In this way the presence of light at a detector indicates the absence of an object in the cavity and the absence of light at the detector indicates the presence of an object in the cavity. In such a system each radiator/detector pair is dedicated to a single cavity of a slat.

The difficulty with that system is that slat-type filling machines ordinarily are capable of using a variety of slats to accomodate different object or pill sizes and different container quantities. Therefore, a variety of interchangeable slats are used in a slat filling machine each differing from the others in the spacing and positioning of the cavities. This variety necessitated the manufacture of a different unique pair of radiator head and a mating detector head, one pair corresponding to the appropriate cavity alignment for each of the possible slats. Then, each time the slats were changed for a different production run the heads had to be changed.

The present invention overcomes this difficulty by providing a single photoradiator array mounted on a single radiator head and a single detector array mounted on a single detector head. This one pair can be used for all of the slats which might be used thus requiring no modification or changing of these parts as the slats are changed and the machine is used for different production runs of different objects or pills.

BRIEF SUMMARY OF THE INVENTION

In a preferred embodiment, the invention has a radiation source means comprising a series of discrete photo radiators, such as photodiodes, which are closely and uniformly spaced along a path across the moving slats. There are at least twice as many discrete radiators as there are maximum possible slat cavities. Although the photodetector could be a single, continuous photodetector, we prefer that the photodetector be a similar series of photo transistors spaced along the opposite side of the slat path from the photoradiators. The photodiodes are energized in time sequence either individually or in adjacent pairs and data is stored to represent whether light was received by the photodetectors opposite each energized photodiode.

An electronic computer which controls the apparatus selects those diodes which are most closely positioned nearest an expected cavity position and determines whether the data for each of those cavity positions represents the presence or absence of an object at that position.

In order to avoid the difficulty of manufacturing one, single long series of radiators and detectors, and in order to permit the manufacture of relatively small modules which can be combined side by side to form inspectors of whatever length is desired, the photodiodes and similarly the detectors are mounted and electrically connected in smaller adjacent, identical groups in modules on printed circuit boards which are positioned side by side in a row. The time for scanning along the diodes in sequence is reduced by alternately scanning all the odd groups simultaneously and then scanning the even groups simultaneously.

Furthermore, to improve the signal to noise characteristics and the resolution of the detectors, the phototransistors along each group are connected together in two separate interdigitated circuits. The odd phototransistors are connected to one amplifier and the even phototransistors are connected to a second amplifier of the group.

The computing control circuitry determines whether a container is short filled, tracks a short filled container as it is indexed away from the filling position and actuates an ejector when the short filled container passes an ejection station.

Additionally, a second pair of photoradiators and photodetectors may be positioned on opposite sides of the slat path downstream from the discharge station. These additional radiating and detecting heads can be used in conjunction with the computer which controls the apparatus to detect whether an article is within the cavity after it should have been discharged into a bottle. In a manner similar to the detection of an empty cavity which should be filled, this detection of a filled cavity when the cavity should be empty is used to eject a container. However, such a stuck product detector is not needed in a filling machine of the type having purge pins such as that illustrated in U.S. Pat. No. 4,017,003.

The preferred embodiment of the invention operates in a transmissive mode. In a transmissive mode the light sources are positioned on one side of the slats or other array of object positions and the detectors are positioned on the other side. Thus, in this mode, transmission of the light through the object position indicates the absence of an object while blockage of the light path by the object indicates the presence of the object.

The systems embodying the present invention may alternatively operate in a reflective mode. In such a mode the radiators and photodetectors are positioned on the same side of the array of object positions. In the reflective mode, when an object is present energy which is incident upon the object position will be reflected by the object to the photodetector. When an object is absent, the incident light will not be reflected to the photodetector. The reflective mode is useful in arrays wherein there is not an open light path through the object positions because of the presence of some object support structure.

Although it is preferred that both the photoradiators and photodetectors be discrete devices, it is only necessary in accordance with the present invention that one of these be discrete. While it is preferred that the photodiodes be discrete, it is also possible, and in the contemplation of the present invention, that the photoradiators be a continuous source while the photodiodes are discrete and are addressed or strobed individually or in pairs.

BRIEF DESCRIPTION OF THE DRAWINGS

FIG. 1 is a view in perspective of a slat filling machine of the type described above illustrating the mounting of the photoradiator and photodetector heads on opposite sides of the slat path.

FIG. 2 is a view in perspective of a typical slat used in the embodiment illustrated in FIG. 1.

FIG. 4 is a view in vertical section taken perpendicular to the view of FIG. 3 and taken substantially along the line 4—4 of FIG. 3.

FIG. 5 is a view in vertical section taken substantially along the lines 5—5 of FIG. 4 and illustrates the synchronization wheel forming a part of the preferred embodiment of the invention.

FIGS. 10 and 11 are truth tables showing the programming of the PROMS illustrated in FIGS. 8 and 9.

Figure 3:
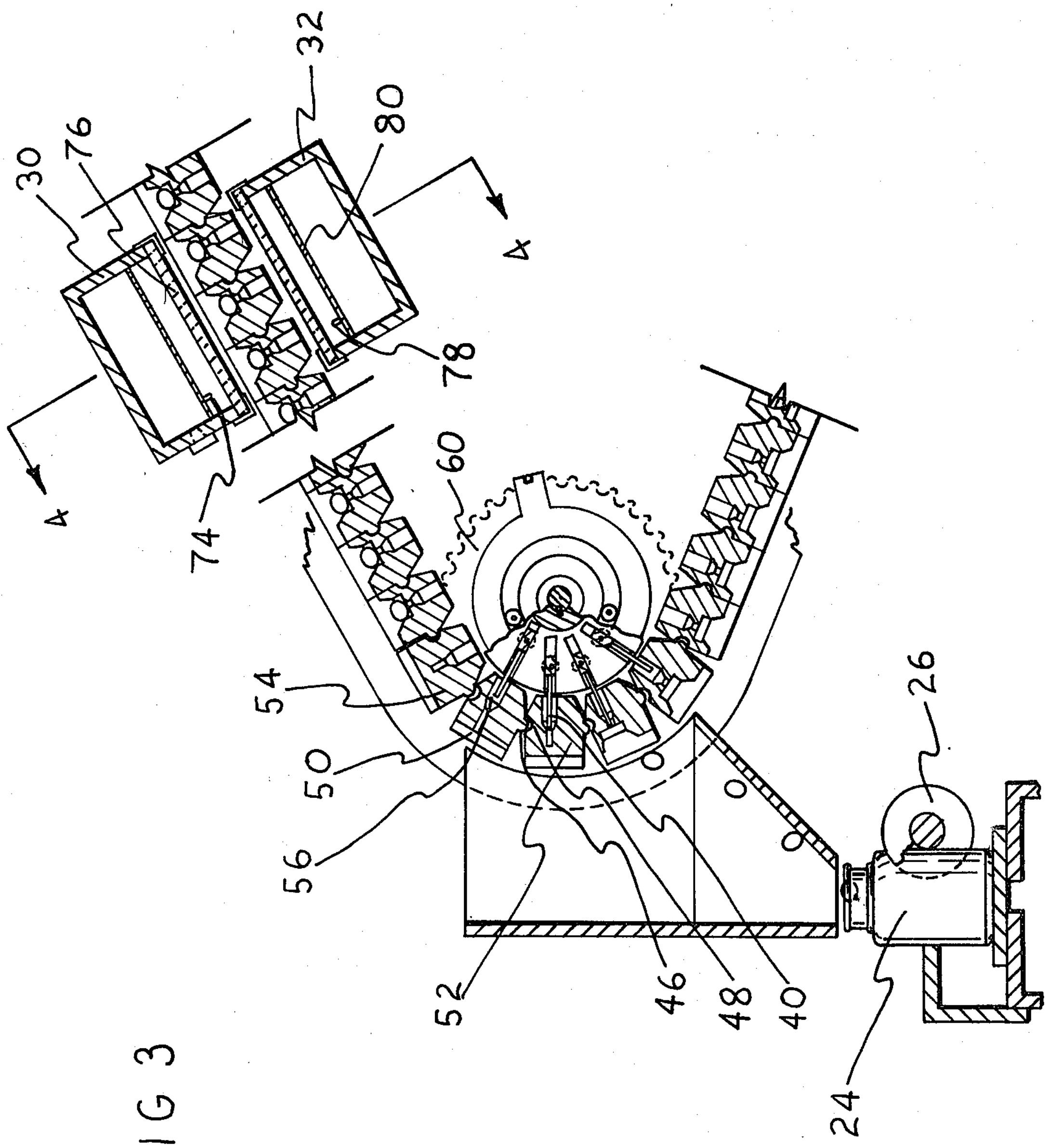
FIG. 3 is a view in vertical section taken substantially along the lines 3—3 of FIG. 1.

In describing the preferred embodiments of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, the term connection is not necessarily confined to direct connection but includes effective connection through other elements where such connection is known as being equivalent by those skilled in the art.

DESCRIPTION OF THE PREFERRED EMBODIMENT OF THE INVENTION

FIG. 1 illustrates a cavity-type, container filling machine 10 having a plurality of side by side slats 12 which are mounted at their ends to a pair of endless chains, one chain 14 being visible. The slats circulate around to form an endless conveyer which receives articles, such as pills, from a hopper 16 and transports them forwardly and downwardly in the slat cavities to a discharge station 20 in the cavities formed in the slats.

A plurality of chutes 22 are spaced along the discharge station 20 above the containers 24 which are similarly spaced beneath the discharge station 20. The containers 24 are conveyed into position by means of an auger-type conveyer 26 with their open mouth in registration with the bottom of the chutes 22.

Articles which are picked up from the hopper 16 are transferred forwardly and downwardly on the slats 12 until they round the lower forward area of the conveyer at the discharge station 20 so that the articles are dropped and fall by gravity through the chutes 22 to the containers 24. When the containers are filled, the conveyer 26 moves the containers past the ejection station and ejector 28 to the remainder of the production line.

The radiation source means or radiator head 30 is mounted above the slats 12 and the radiation detector means or detector head 32 is mounted opposite the source means 30 and beneath the slats 12.

FIGS. 2–5 illustrate this structure in more detail. The slats comprise a plurality of cavities 34. Although the object, such as a pill, is received in the cavities 34, smaller holes, such as holes 38, are formed for passage of the purge pins, such as purge pin 40 illustrated in FIG. 3.

Each slat is provided with a pair of bores at its opposite end, such as bores 40 and 42 in slat 36 for securing the slat in the conveyer. The bores receive upstanding pins, such as pin 44, which are connected to the conveyer chains such as conveyer chain 14.

Each of the slats are provided with a forward and rear tongue and groove respectively such as tongue 46 and groove 48 illustrated in FIG. 3. The mating tongues and grooves maintain the positioning of the slats and prevent the passage of radiated light between the slats.

It is also preferred to utilize test slats in connection with each group of slats. A group of slats is termed a bank. A series of three test slats is used and includes an intermediate test slat 50 and test slats 52 and 54 on opposite sides of the intermediate test slat 50. Test slat 50 has no article containing cavity but is provided with a through passageway 56 so that light will always be detected through all openings of this slat when it passes between the light radiating means 30 and the light detecting means 32. Test slats 52 and 54 are provided with holes for receipt of the purge pins, such as purge pin 40 extending into test slat 52, so that the slats will not interfere with operation of the purge pins. They have no cavity and the light path is blocked because the purge pin hole is formed only part way through the slat. These test slats 52 and 54 therefore will never permit the passage of light from the radiating means to the detector means. The three test slats enable testing of the inspection circuitry.

The conveyer chains, such as conveyer chain 14, ride along a plurality of rollers such as roller 58 and also engage a plurality of sprockets such as sprocket 60 and synchronizing sprocket 62. The synchronizing sprocket 62 is fixed to a rotatable shaft 64 and carries a synchronizing wheel 66. The synchronizing wheel 66 has a plurality of regularly spaced slots, such as slot 68, about its periphery. The angular width of each slot corresponds to the linear width of each cavity measurement region along the direction of travel of slats which have a single row of cavities or multiple rows of smaller cavities in the same region.

A photodiode 70 and cooperating photo detector 72 are positioned on opposite sides of the slots in the synchronization wheel 66. The passage of light from the radiator 70 to the detector 72 signals the control computer that a series of cavities are positioned between the photoradiators of the radiating means 30 and the photodetectors of the detecting means 32 and therefore the scanning of the cavities should be performed. In practice we prefer to make the slots slightly wider than exact correspondence with the cavity width so that scanning will begin just before a cavity edge normally arrives at the line of eight between the radiators and detectors and ends just afterwards. This allows for any misalignment of the slats and permits several scans to be made of the cavities as they pass between the radiating and the detecting means.

The radiating means 30 which is mounted upstream of the discharge station 20 comprises a plurality of photodiodes 74 mounted along a series of printed circuit boards 76 in the radiating means head 30. Similarly, the photodetecting means 32 has a plurality of phototransistors 78 mounted along a plurality of printed circuit boards 80 in closely spaced relationship. The printed circuit boards are each mounted in respective enclosures 82 and 84, each of which is covered with a translucent Lexan panel 86 and 88 respectively.

Figure 8:
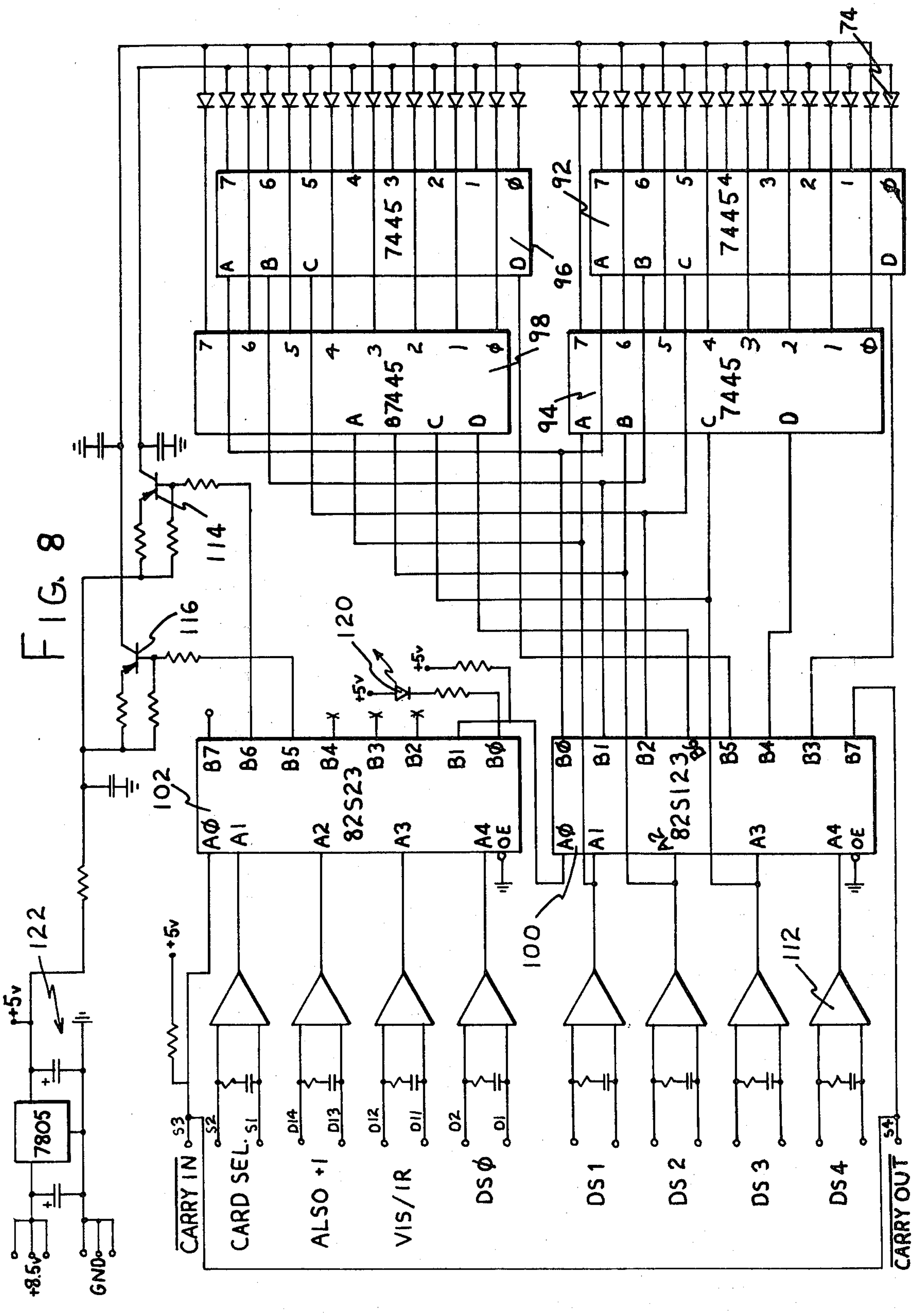
FIG. 8 is a schematic diagram of a group of photoradiators and associated circuitry mounted on a printed circuit board which is a part of the preferred embodiment of the invention and forms one radiator module.

FIG. 8 illustrates in detail the circuitry of one group or module of the radiator means 30. Although it is only necessary to space the photodiodes so that there are at least twice as many as there are cavities in the slat having the most number of cavities, we prefer to have at least three times as many diodes as there are cavities. Each of the photodiode radiators 74 is connected to and driven by a BCD to decimal decoder/driver of the open collector type, formed as a part of integrated circuit 7445. These four decoder/drivers 92, 94, 96 and 98 in turn have their inputs connected to a Programmable Read Only Memory or PROM 100. All of the inputs to the radiator module are connected to the PROM 100 and a similar PROM 102.

All of the module inputs are of the differential input type for improving noise immunity. All are applied through differential input line receivers 112 formed of integrated circuits type 9613. Although all of the diode anodes could be connected to the supply voltage through a resistor, additional diode selection capability is possible by connecting them to drive transistors 114 and 116, the inputs to which are connected to output pins 6 and 5 of PROM 102 for selectively enabling the even or the odd diodes.

The diodes are selected by the five digit binary input to the diode select inputs DS0 through DS4 and the ALSO +1 input which are common to all modules and are connected to the control computer. All radiator modules along the radiating head 30 simultaneously receive the same six bit data word. Each of the 32 states of the five bit word applied at DS0 through DS4 selects a different one of the photodiodes 74. The ALSO +1 input selects whether its neighbor is to be simultaneously illuminated. The PROMS 100 and 102 are appropriately programmed to actuate the decoder/drivers 92-98 to select the appropriate diodes for each module. This programming is shown in FIGS. 10 and 11.

As stated above, all of the odd radiator modules are simultaneously scanned and then all of the even radiator modules are scanned. The data port at inputs S1 and S2 is also connected to the control computer for selection of each particular module. Thus, a module is selected when its data input at S1, S2 represents a 0 and is not selected when the data input represents a 1.

Although it is not essential, it is preferable that two diodes rather than just one be energized at the same time. Thus, the data input port at terminals D13 and D14 is used to energize the diode adjacent and immediately above the diode selected by the diode select input ports DS0 through DS4.

Although not a part of the present invention, the preferred circuitry has some testing modes in which it is desirable to illuminate a photodiode 120 which radiates in the visible spectrum. A data input port at terminals D11 and D12 is used to select that diode instead of the photodiodes 74. Carry out terminal B7 from the 82S123 connected to the carry in input A0 of the 82S23. It is the only data connection from DS0–DS4 to the 82S23. Functionally it is used when a diode at the end of one module is illuminated and the diode on the adjacent module must be illuminated to provide the illumination of an adjacent pair of diodes. Since all data is applied to all the modules simultaneously, the necessary diode is selected by the logic of its own module in accordance with the table of FIGS. 10 and 11. The schematic diagram also shows the power supply circuit 122 for the module.

The drive transistors 114 and 116 are used to select either of the two sets of diodes to which they are respectively connected. They are connected as constant current sources for regulating the current through the selected diodes. They simultaneously serve to provide additional data input ports for selecting the single diode or adjacent pair of diodes to be selected. If the decoder/drivers 92-98 were replaced with devices having 5 data input ports, the additional data input ports from the drive transistors would not be needed and the diodes could all be connected directly to the source 122. However, such devices would be more expensive and the current regulation would be lost.

Figure 9:
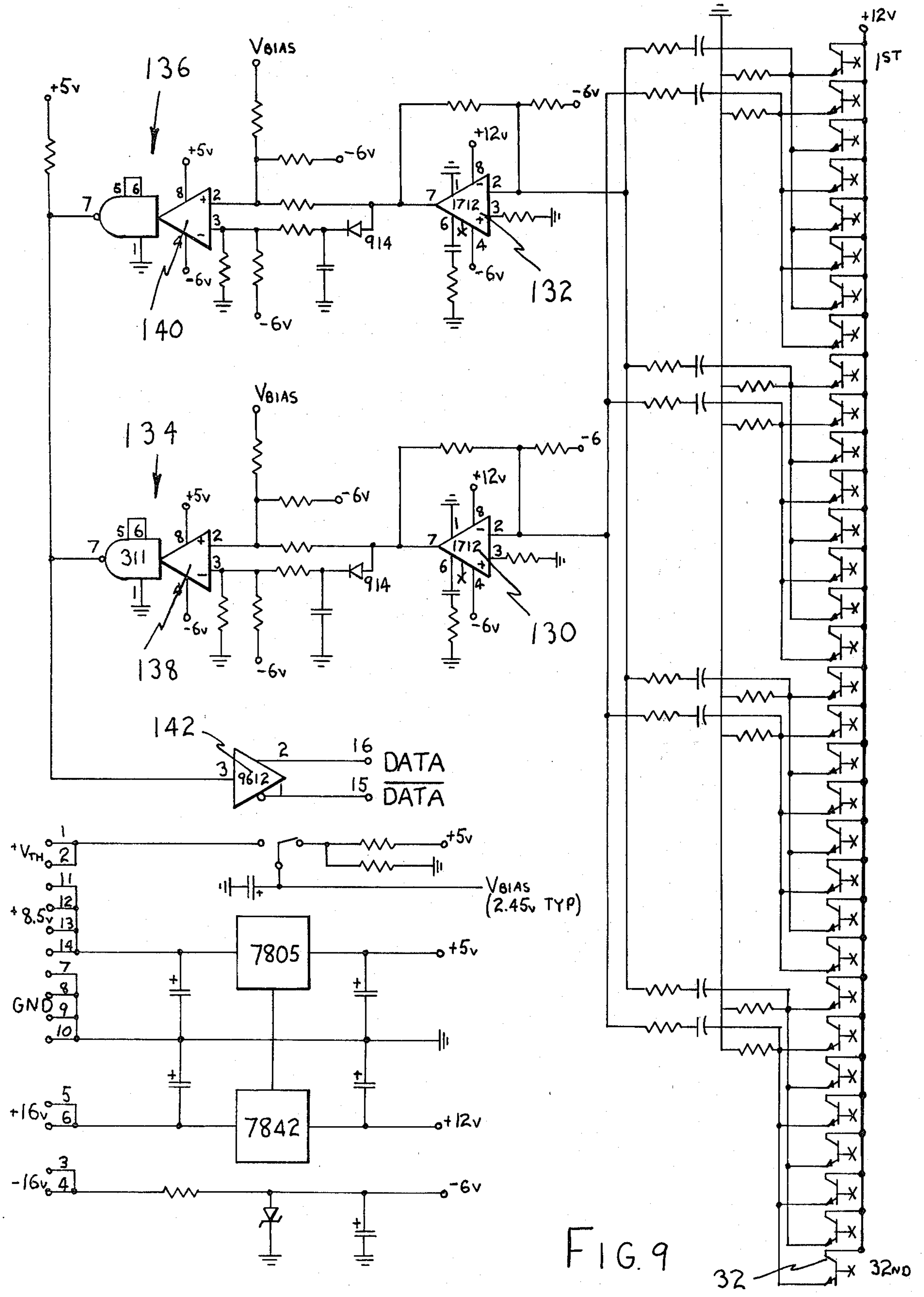
FIG. 9 is a schematic diagram of a group of photodetectors and associated circuitry which is mounted on a printed circuit board which is a part of the preferred embodiment of the invention and forms a detector module.

FIG. 9 illustrates the circuitry of the detector modules. The phototransistors 32 are connected to the inputs of op-amps 130 and 132. In particular, interdigitation of the phototransistors 32 is accomplished by connecting the odd phototransistors to op-amp 132 and the even phototransistors to op-amp 130. The outputs of op-amps 130 and 132 are connected respectively to threshold detector circuits 134 and 136 which include linear comparators 138 and 140.

The outputs of the threshold detector circuits 134 and 136 are connected together and applied to the line driver 142 to provide a differential output data port which is connected to the control computer.

The tying together of the outputs of the two threshold detectors accomplishes a logical OR function. If one or more phototransistors, either odd or even, detect light then the detection of light at either one or the other or both of the threshold detectors will cause the data output port at terminals 15 and 16 to signal the reception of light.

The interdigitation of the connection of the phototransistors, that is the connecting of alternate phototransistors to two different threshold detectors is based upon considerations of the desired threshold level and the maximum signal expected from receipt of the maximum quantity of light. The threshold level which is determined by the circuitry of the threshold detectors is selected to be a level above which a signal applied to the threshold detector will cause the data output port to signal the reception of light. Obviously this threshold level must be above any expected noise levels. Although noise can be caused by several sources, it is principally generated by each phototransistor. Therefore, the signal to noise characteristics could be improved by having an individual amplifier for each phototransistor. Since this is impractical and expensive the noise can be least be halved by using two amplifiers and connecting half the phototransistors to one and half to the other. This noise reduction could be accomplished by connecting the first 16 adjacent phototransistors to one amplifier and the second 16 adjacent phototransistors to the other amplifier.

However, an additional problem arises because each photodiode, when its light passes through an empty cavity, does not radiate solely onto its single opposite phototransistor. Instead, its light is spread across not only its opposite phototransistor but also in lesser intensities on its neighbors. Thus, for an example, light of one intensity may be incident on a directly opposite phototransistor and light of half that intensity may be incident upon each of its adjacent neighbors. Since the openings to the cavities of the slats are not always perfectly aligned, it is necessary to be able to detect the incidence of light of the lesser intensity upon a neighbor. Thus, two extreme conditions are possible. The threshold detector must be able to detect the incidence of light upon an adjacent neighbor even when that adjacent neighbor is the only one of the sixteen diodes connected to a single amplifier which receives light. That condition would occur when light is received from a diode located at the edge of a radiating module by a phototransistor on a module which is adjacent to the module which is opposite the module on which the radiating diode is mounted.

If sixteen adjacent phototransistors were connected to a single amplifier, that amplifier must also be capable of handling a signal which is the summation of light received if all three light receiving phototransistors are connected to the same amplifier. The signal for light received in this case (if all three light receiving phototransistors were connected to the same amplifier) would be, for example, four times greater than the signal received when only one phototransistor receives light as a neighbor (i.e., light which is one-half the intensity of the light which might be received by a directly opposite phototransistor). Thus, the operating range of the amplifiers would have to be capable of handling signals with the ratio of maximum signal to minimum signal of 4 to 1.

However, by interdigitating the phototransistors in the manner shown in FIG. 9, the threshold level remains the same, the noise is halved by using two amplifiers and yet, the ratio of the maximum signal to the minimum signal will be 2 to 1. Thus, the maximum signal applied to any amplifier will be the result of the summation of two neighbor diodes each receiving light of one-half that received by directly opposite phototransistor, or in the alternative, it will be the signal received by a directly opposite phototransistor. Thus, the maximum signal is halved while the minimum signal (light from only one neighbor at a module edge) remains the same.

The output of the two comparators are connected directly together but this provides an OR function because of the open collector circuit configuration.

Figure 6:
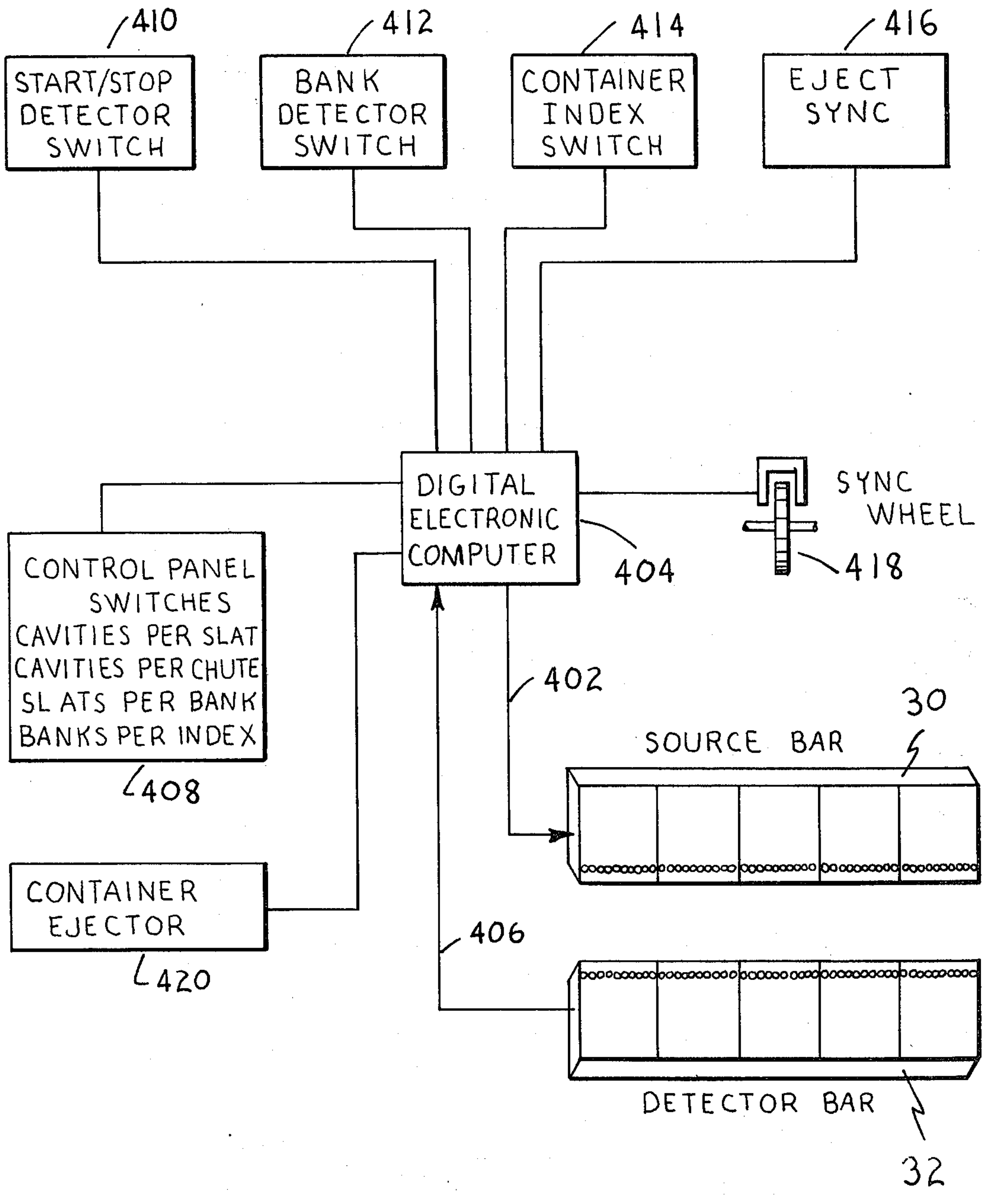
FIG. 6 is a block diagram illustrating the inspection system which is the preferred embodiment of the invention.
Figure 6A:
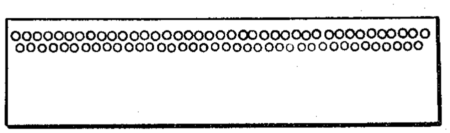
FIG. 6A illustrates an alternative embodiment of the detector bar.

The detector module may be further improved by physically staggering the phototransistors in the direction of travel of the slats as illustrated in FIG. 6A.

Because the detectors have finite width and the slats are travelling at a selected speed, there is a brief time interval during which the passageways through the slats are in sufficient alignment with the light path from the diodes to the phototransistors that light is able to pass from the photodiodes to the phototransistors if no object is present in the slat cavity. Because each scan requires some time, there is a maximum speed of travel of the slats along the conveyor.

The time interval during which light can be received by a detector module can be lengthened by staggering the phototransistors on the detector modules in the manner illustrated in **6*b*. By spacing or offsetting the phototransistors from the linearly aligned arrangement of FIG. 6 to the staggered arrangement of FIG. 6A**, the time during which a phototransistor is positoned to receive light through an unblocked passageway is increased. This increased time interval allows more computer operations to be performed or allows the machine to operate at a higher speed or permits some of each.

The scanning time during which all the radiators are sequentially illuminated can be significantly decreased by scanning the odd and even modules in alternating, interposed sequence.

The amplifiers on the detector modules have a finite rise time. Therefore, time is required for them to settle before a new signal is applied. When scanning is done first along all of the even cards and then along all of the odd cards, a settling time is required after actuation of each diode pair because the same amplifiers of the same photodetector modules will be needed to amplify a light signal if light is received from the next pair of actuated diodes.

However, we have found that we can actuate the first diode pair on the even cards and then, while the even detector module amplifiers are settling, the first diode on the odd radiator modules can be actuated. Then the second diode pair is actuated on the even modules and while the amplifiers are settling the second diode pair on the odd modules are actuated. This continues in such alternating, interposed sequence through the modules until all of the sources have been activated and the scan data is collected and stored in memory. Thus, instead of a simple time delay during the settling time, the settling time for the even modules can be used to actuate the odd modules and the settling time for the odd modules can be used to actuate the even modules.

THE SYSTEM

The complete radiator source head and complete photodetector head for a slat-type container filling machine may have any desired number of modules of the type illustrated in FIGS. 8 and 9 dependent upon the length of the slats. Some machines utilize longer slats than others. We have found it desirable to construct radiator source heads and photodetector heads having 3, 5 or 12 modules to accomodate the slat filling machines of the type manufactured by Lakso Corporation.

FIG. 6 illustrates five modules forming each of the heads. A radiator source data input bus 402 connects the electronic computer 404 which controls the apparatus to the radiator source head 30. The digital electronic computer may be any general purpose type computer or preferably one specially constructed to accomplish the purposes of the present invention. Since such equipment and its operation is well known in the art it is not described in this application. Its operation will be described below only to the extent necessary for a person of ordinary skill in the art to apply the principles of the present invention with the use of the digital electronic computer.

A second data bus 406 connects the output from each of the detector modules to the digital electronic computer 404.

A plurality of various control panel data input switches 408 are also connected to the digital electronic computer 404. For example, the apparatus of the present invention includes a control panel on which four sets of Decade thumb switches are located. An operator utilizes those switches to input to the computer 404 the number of cavities of each slat positioned in the machine, the number of cavities which will dump into each chute, the number of slats in a bank of slats and the number of banks which will pass the dumping discharge station before an index of the containers occurs. Other input switches include a start/stop switch 410, a bank detector switch 412 and a container index switch 414. These input switches 408–404 are from time to time strobed by the computer and their input data is utilized by the computer as called for by the set of instructions.

Other inputs to the control digital computer 404 include the input of the synchronization wheel described above and an eject sync which is generated when a container is positioned at the ejection station and interrupts a light beam detection system (not illustrated) to signal that the container is at the ejection station. The computer 404 also provides an output signal for operating the container ejector 28 when a short filled bottle arrives at the ejection station.

The preferred container ejector is a pneumatic device which permits the impingement of a blast of air upon a bottle to blow it from the production line conveyor. The computer actuates a valve to release this short blast of air.

OPERATION OF THE PREFERRED EMBODIMENT

The control computer used in the present invention is provided with data in its initial programming which represents the physical dimensions of the embodiment of the invention. In particular, the preferred special purpose computer stores in its read only memory the distance between the photodiodes in each module, the distance between diodes across the boundary between modules and a nominal initial distance from a reference line along the ends of the slats to the first diode. A memory is also provided with the distance between the cavities for each of the possible slats which might be used in the machine and a distance from the reference to the first cavity. In this manner the computer can take the input data from the control panel switches which signals the number of cavities per slat and go to a look up table and determine the cavity spacing for such slats. The use of this data is described below.

In subsequent operation of the inspection system each discrete diode is actuated with its subsequent neighbor and a data bit is generated for each indicating whether or not light was detected by the detector during actuation of each particular diode together with its neighbor. A sequence of bits will be generated the number of which will equal the number of photodiodes. Thus, in a three module system 96 bits will be generated while in a twelve module system 384 bits will be generated.

Prior to such scanning, the computer must generate data for determining which of these bits represents photodiode light sources which are nearest to alignment with the cavity. This data to distinguish the important data bits is referred to as the cavity mask.

This cavity mask is generated using the following two equations:

$$D_C = d_1 + N_{cav} S_{cav} \quad \text{I.}$$

$$D_D = d_2 + N_{Diode} S_{Diode} + N_{CARD} S_{CARD} \quad \text{II.}$$

wherein:

$D_C$ is the distance to a cavity $N_{cav}$;

$D_D$ is the distance to a diode $N_{Diode}$;

$d_1$ is the distance from the reference line to the first cavity;

$d_2$ is the distance from the reference line to the first diode;

$S_{cav}$ is the cavity spacing;

$S_{Diode}$ is the diode spacing;

$N_{CARD}$ is the number of card boundaries crossed to get to $N_{Diode}$; and $S_{CARD}$ is the space between diodes across module boundaries.

Figure 7:
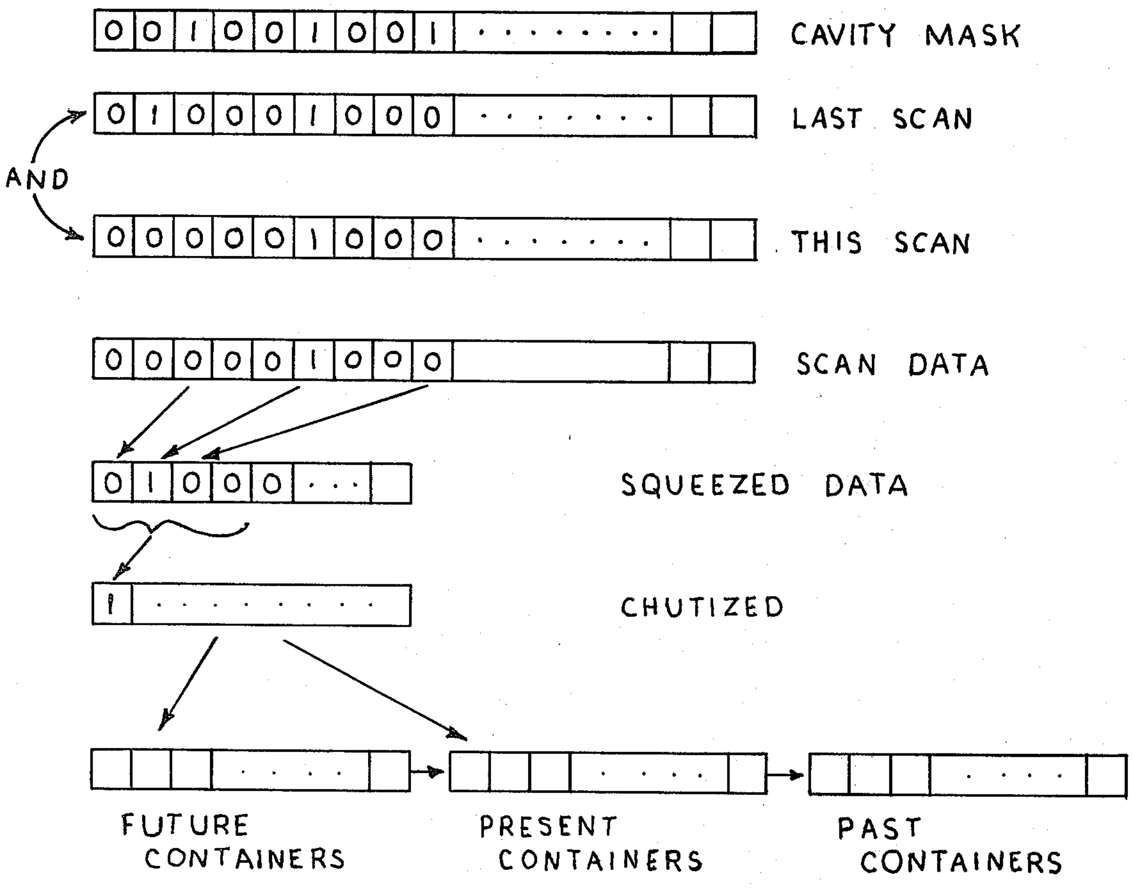
FIG. 7 is a simplified memory register diagram illustrating the operation of the preferred embodiment of the invention.

Using equation I the computer first computes the distance to the first cavity $D_{CO}$. This is computed as equal to the distance $d_1$. The computer then begins calculating $D_D$ which is the sum of the distance to the first diode $d_2$ plus the spacing between the diodes times the diode number plus $N_{CARD}$, which is 0 for the first module multiplied by $S_{CARD}$. The computer continues making this computation each time incrementing $N_{Diode}$ by 1 until a computation is made wherein $D_{Diode}$ just exceeds $D_{CO}$. The diode number for that computation is then reduced by 1 and represents the diode address of a diode which is near alignment with a cavity. When this diode is selected on the source module described above, it and its subsequent neighbor will be energized so that a diode aligned with the cavity or two diodes straddling the line of sight through the cavity, will be illuminated. The computer then continues the computation by inserting the number 1 for $N_{cav}$ to compute a new $D_{CI}$. It then continues incrementing $N_{Diode}$ and $N_{CARD}$ as required until the second $D_{Diode}$ is calculated which just exceeds $D_{CI}$. This diode number is decremented by one and the result again represets a diode near alignment with the cavity and the procedure continues as described above. The result is that each time a diode number is substituted in equation II by the computer and a number is calculated which is less than $D_{CN}$, a zero is placed in a cavity mask memory. However, when a calculation of $D_D$ just exceeds the calculation of $D_C$ a 1 is placed in the memory corresponding to the diode number just preceding the one which produced the $D_C$. FIG. 7 shows an example of such a cavity mask derived in this manner. Each 1 represents the position of a cavity.

The computer, when signalled by the synchronization wheel 418 that cavities are located between the photodiodes and phototransistors, then begins scanning in sequence along the diodes. First the even modules are simultaneously scanned and their data is entered in the appropriate memory cells of a "this scan" data memory, such as illustrated in FIG. 7. Each memory cell corresponds to data for a particular diode address. As each diode is addressed, if an output indicates that it resulted in reception of light on a detector module a 1 is entered in the corresponding memory cell.

For all diode illumination conditions, except when a diode near the edge of module is illuminated, whether light is detected at a detector module can be determined by data solely from the detector module which is directly opposite to the module on which the illuminated diode is mounted. However, when a diode near an edge is illuminated, data from the neighbor detector module must also be examined because light may be incident upon a photodetector located across the boundary on the neighbor module.

To accomplish that, whenever a diode near an edge is illuminated, the data from the directly opposite detector module is logically ORed with its adjacent neighbor so that if either module detects receipt of light, a logical 1 is entered in the memory cell corresponding to the illuminated diode or diodes.

After the first scan is completed, the data in the "this scan" register is shifted to the "last scan" register and scanning is repeated to again fill the "this scan" register. Thereafter each bit in the "this scan" register is logically ANDed with the bit in the corresponding position of the last scan register and the result is ORed into the scan data register. Thus, the "this scan" and "last scan" are ANDed to eliminate any data bits which result from electrical noise. This means that light must be seen in two successive scans to allow the conclusion that light was received by the photo diode. The result of this logical ANDing is ORed into the "scan data" so that the "scan data" register will contain the results which indicate that light was seen in any two successive scans across the cavities.

After all scans are completed, that is after a light path no longer exists through a slot of the synchronization wheel, the cavity mask is used to select the data bits of the "scan data" register which represent data for cavity positions. Each bit in the "scan data" register for which there is a 1 in the corresponding position in the cavity mask is shifted into the "squeezed data" register. Each bit in the "squeezed data" register therefore represents an indication of whether or not light was received at a cavity position.

The computer then ORs together a contiguous number of bits equal to the number of cavities which dump into a single chute and positions the result in a single memory cell of the "chutized" register. Each bit of the "chutized" register indicates whether a single container is short filled. If, for example, four cavities dump into each chute then the first four bits of the squeezed data register are ORed into the first cell of the chutized register, the next four into the next location, etc. Thus, each bit in the chutized register represents one bottle and the appearance of a 1 at any one or more bit locations represents a short filled bottle.

Because the radiating and detecting heads are upstream from the discharge station, the presence of an empty cavity at the heads may represent either a short filled bottle which presently is at the discharge station or if the bottles will be removed before the detected cavity reaches the discharge station, will represent a short filled bottle which in the future will be shifted to the discharge station. To determine which condition exists, the computer need merely keep a continuous count of the number of slats passing by a reference point along the slat conveyor and compare that count to the data input at the panel switches.

The "chutized" data is ORed into the present container register until slats begin passing under the radiating and detecting head which will not reach the discharge station until new empty bottles are positioned at the discharge station. Thereafter the "chutized" data is shifted into the future container register. Upon an index of the bottles away from the discharge station, the "present container" data is shifted into the "past container" register and the "future container" data is shifted into the "present container" register and the process then continues.

Thus, the container registers represent data in serial form having one bit for each bottle and sequenced in the identical order of the bottles leaving the filling machine. The ejector station may therefore be positioned at any desired integral number of bottle spacing distances along the production line. As a bottle moves past the ejection station the data bit corresponding to that bottle is examined by the computer and if found to be a 1 the bottle ejection signal is generated to eject the bottle.

The detecting apparatus of the present invention includes a source bar, a detector bar and the associated circuits and equipment illustrated in FIG. 6 and described above.

This detecting apparatus described above is positioned upstream from the discharge station as illustrated in FIG. 1. If desired, a second detecting apparatus identical to the first is positioned downstream of the discharge station but it is not visible in FIG. 1 since it would be on the underside of the conveyor. This is described further in the Brief Summary Of The Invention.

Furthermore, the digital electronic computer 404 illustrated in FIG. 6 may, if desired, store the series of desired presence-absence signals for the object positions, compare desired presence-absence signals to the detected presence-absence signals and generate an alarm signal in the event the compared signals are not identical.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

We claim:

1. An apparatus for detecting the presence and absence of objects in an array of predetermined object positions said apparatus comprising:

(a) A cooperating radiation device means for directing electromagnetic energy toward said array and a radiation detector means for receiving said electromagnetic energy which is incident upon said object position under only one of the two possible conditions which are an object being present and being absent and for not receiving said energy under the other condition, a first one of said cooperating means comprising individually addressable discrete devices spaced along said array, there being at least twice as many of said discrete devices as there are possible object positions;

(b) digital addressing circuit means connected to said discrete devices for sequentially actuating said discrete devices;

(c) circuit means connected to and for actuating the second one of said cooperating means during the actuation of said discrete devices;

(d) data storage circuit means connected to said addressing circuit means and the radiation detector means for storing data representing the presence or absence of received radiation during actuation of each of said discrete devices; and (e) electronic data processing means for storing the addresses of discrete devices representing the approximate object positions in said array and for comparing the data for each of said object position addresses to the desired data for each of said object position addresses and providing an output in the event they are not identical.

2. An apparatus in accordance with claim 1 wherein said addressing circuit means sequences through said devices by simultaneously actuating adjacent pairs of discrete devices.

3. An apparatus in accordance with claim 2 wherein said radiation device means comprises a row of adjacent groups and said detector means comprises a row of corresponding, juxtaposed adjacent groups and wherein said addressing circuit means simultaneously sequences along every other one of said adjacent groups and then simultaneously sequences along the other groups.

4. An apparatus in accordance with claim 1 wherein there is further provided a plurality of test slat means positioned in said array, at least one of said test slat means having a plurality of unblocked light paths corresponding to said object positions for permitting transmission of light from said radiation device means to said radiation detector means and at least another of said test slat means having wall means for blocking the transmission of light from said radiation device means to said radiation detector means.

5. An apparatus in accordance with claim 1 wherein said discrete devices are spaced in a direction transverse to said array in an alternately staggered pattern for increasing the effective width of said means comprising the discrete devices.

6. An apparatus for detecting the presence and absence of objects in an array of predetermined object positions said apparatus comprising:

(a) first discrete electromagnetic radiation devices spaced along said array there being at least twice as many devices as there are object positions in said array, said devices positioned to direct their radiated energy toward said array;

(b) a first plurality of radiation detectors spaced along said array and positioned to receive energy which is incident upon said object positions of said array under only one of the two possible conditions of an object being present and being absent and not receiving energy under the other condition;

(c) digital addressing circuit means connected to said devices for sequentially actuating said devices;

(d) data storage circuit means connected to said addressing circuit means and the radiation detector means for storing the presence or absence of received radiation during actuation of each of said discrete devices; and (e) electronic data processing means for storing the addresses of said devices representing the approximate object positions in said array and for comparing the data for each of said object position addresses to the desired data for said object position addresses and providing an output in the event they are not identical.

7. An apparatus in accordance with claim 6 wherein said addressing circuit means simultaneously actuates adjacent pairs of said devices as it sequences through said devices.

8. An apparatus in accordance with claim 7 wherein every other one of said detectors in each group is connected to a first amplifier circuit for their group and the other detectors are connected to a second amplifier for their group and wherein the outputs of said two amplifiers are each connected to its own comparator circuit for switching its output to a first level when the amplified output signal exceeds a selected threshold and to a second level when the amplifier signal is less than said threshold level and wherein the outputs of said comparators are connected to a logic OR means, the output of which is the output of its group of detectors and is connected to said electronic data processing means.

9. An apparatus in accordance with claim 6 wherein said devices comprise a row of adjacent groups and said detector means comprises a row of corresponding, juxtaposed adjacent groups and wherein said addressing circuit simultaneously sequences along every other one of said adjacent groups and then simultaneously sequences along the other groups.

10. An apparatus in accordance with claim 6 wherein said devices comprise a row of adjacent groups and said detector means comprises a row of corresponding, juxtaposed adjacent groups and wherein said addressing circuit means simultaneously actuates every other one of said adjacent groups and then simultaneously actuates the other groups each time addressing a different device in each group and continues in alternating, interposed sequence through said groups until all of said devices are activated.

11. An apparatus in accordance with claim 6 wherein said first radiation devices and said first radiation detectors are positioned upstream from a discharge station at which said objects are removed from the array and wherein the apparatus further comprises:

(a) second discrete electromagnetic radiation devices positioned downstream of said discharge station and spaced along said array there being at least twice as many devices as there are object positions in said array, said devices positioned to direct their radiated energy toward said array; and
(b) a second plurality of radiation detectors spaced along said array and positioned to receive energy which is incident upon said object positions of said array under only one of the two possible conditions of an object being present and being absent and not receiving energy under the other condition.

12. A method for detecting the presence and absence of objects in an array of predetermined object positions, using a plurality of discrete light sources and detectors, said method comprising:

(a) positioning at least twice as many of said light sources as there are object positions at spaced intervals along said object positions;
(b) radiating light upon said object positions in time sequence from said light sources;
(c) detecting, each time a source is actuated, the presence or absence of light transmitted through said object positions and electronically storing a signal indicating said presence or absence; and
(d) selecting the light source positions nearest to each object position and storing the presence-absence signal corresponding to the selected positions.

13. A method in accordance with claim 12 for additionally generating an alarm signal and further comprising:

(a) storing a series of desired presence-absence signals for said object positions;
(b) comparing said desired presence-absence signals to said detected presence-absence signals; and
(c) generating an alarm signal in the event the compared signals are not identical.

14. A method in accordance with claim 13 wherein each time a light source is actuated its immediately preceeding light source is simultaneously actuated and wherein the selected light sources are the ones which are nearest and on opposite sides of each object position.

15. A method in accordance with claim 12 wherein said radiating and detecting steps are repeated to provide multiple scans and wherein said stored signals for corresponding positions from each scan are then logically ANDed and the result stored as the presence-absence signals.

16. A method for detecting the presence and absence of objects in an array of predetermined object positions, using a plurality of discrete light sources and detectors, said method comprising:

(a) positioning at least twice as many of said light sources as there are object positions at spaced intervals along said object positions;
(b) radiating light upon said object positions in time sequence from said light sources;
(c) detecting, each time a source is actuated, the presence or absence of light reflected from said object positions and electronically storing a signal indicating said presence or absence; and
(d) selecting the light source positions nearest to each object position and storing the presence-absence signal corresponding to the selected positions.

17. A method in accordance with claim 16 for additionally generating an alarm signal and further comprising:

(a) storing a series of desired presence-absence signals for said object positions;
(b) comparing said desired presence-absence signals to said detected presence-absence signals; and
(c) generating an alarm signal in the event the compared stored signals are not identical.

18. A method in accordance with claim 16 wherein each time a light source is actuated its immediately preceeding light source is simultaneously actuated and wherein the selected light sources are the ones which are nearest and on opposite sides of each object position.

19. A method in accordance with claim 16 wherein said radiating and detecting steps are repeated to provide multiple scans and wherein said stored signals for corresponding positions from each scan are then logically ANDed and the result stored as the presence-absence signals.

* * * * *